United States Patent
Ono et al.

(10) Patent No.: US 6,270,886 B1
(45) Date of Patent: *Aug. 7, 2001

(54) PAINT MASKING TAPE

(75) Inventors: Manabu Ono; Masao Murakami, both of Tochigi (JP)

(73) Assignee: Sony Chemicals Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,849

(22) Filed: Apr. 28, 1998

(30) Foreign Application Priority Data

Apr. 30, 1997 (JP) .................................................. 9-113070
May 6, 1997 (JP) .................................................. 9-115486

(51) Int. Cl.⁷ ................................ B05B 15/04; C09J 7/02
(52) U.S. Cl. .......................... 428/343; 428/354; 428/413; 428/423.1
(58) Field of Search ..................................... 428/343, 354, 428/413, 423.1; B05B 15/04; C09J 7/02

(56) References Cited

U.S. PATENT DOCUMENTS 5,000,809   3/1991   Adesko et al. ........................ 156/230

FOREIGN PATENT DOCUMENTS

| 668335 A2 | * | 8/1995 | (EP) | ................................. C08J/3/24 |
| 2-34680 | * | 2/1990 | (JP) | ................................. C09J/7/02 |
| 4-243578 | | 8/1992 | (JP) . | |

* cited by examiner

Primary Examiner—Bruce H. Hess
Assistant Examiner—Ling Xu
(74) Attorney, Agent, or Firm—Sonnenschein, Nath & Rosenthal

(57) ABSTRACT

The paint masking tape comprises a substrate, an adhesive layer formed on one side of the substrate, and a backing resin layer formed on the back surface of the substrate. Here, the backing resin layer contains a urethane resin and an epoxy resin or a compound containing aziridine ring(s). The paint masking tape does not tear easily when peeled off from a paint object, inhibits the flaking-induced scattering of paint flakes, and provides clearly visible parting lines.

11 Claims, 4 Drawing Sheets

PAINT MASKING TAPE

BACKGROUND OF THE INVENTION

1. Field of the Invention

The present invention relates to a paint masking tape, and more particularly to a paint masking tape that does not tear or scatter paint flakes easily when peeled off.

2. Description of the Related Art

The paint masking tapes widely used in the painting of vehicles or buildings are commonly configured in such a way that an adhesive layer for pasting the masking tape to the paint object is formed on one side of a tape substrate such as a plastic film (polyolefin film, polyester film, or the like) or paper.

A paint masking tape must provide clearly visible "parting lines" (border lines between painted areas and unpainted areas, or border lines between areas painted in different colors). A paint masking tape must also be easy to handle and must not tear readily or cause flaking (a phenomenon in which the coat of paint on the tape separates in flakes from the tape substrate during tape removal) when peeled off, contaminating the painted surface.

A technique in which a resin layer is formed in order to inhibit or otherwise affect flaking on the adhesive-free surface of the tape substrate of a paint masking tape (on the back surface of the substrate) has been widely used in the past in order to meet such requirements.

For example, Japanese Patent Application Laid-Open No. 2-247272 describes a paint masking tape obtained by applying and forming a chlorinated polyolefin film on the back surface of a polyolefin film substrate, and has a statement that the chlorinated polyolefin film improves adhesion between the tape surface and the paint coat, preventing flaking in which the resulting paint flakes are peeled off and scattered, and making it possible to prevent the paint surface from being contaminated.

In addition, Japanese Patent Application Laid-Open No. 7-82536 describes a paint masking tape obtained by applying and forming a specific vinyl copolymer film on the back surface of a paper substrate, and has a statement that the specific vinyl copolymer film imparts flexibility to the entire paint masking tape, preventing the tape from being fragmented when it is peeled off, and making parting lines on curved portions clearly visible.

A disadvantage of this approach, however, is that when the paint masking tapes described in the aforementioned publications are actually used during the surface painting of vehicles, these tapes easily tear during their removal.

The inventors have conducted a detailed study into the reasons for this phenomenon and found that the paints used for the surface painting of vehicles are usually so-called baking paints, which possess thermosetting properties and form extremely hard and brittle paint films when baked. Specifically, separating a paint masking tape from a painted surface (painted object) facilitates tape tearing because the masking tape and the paint film are firmly bonded and integrated, and the hardness and brittleness of the paint film in a laminate composed of a masking tape and a paint film remain dominant even when the tape substrate is rendered highly flexible. In the particular case of a paint object with a complicated or curved shape, it is very difficult even for an experienced person to peel off the tape without tearing it.

To address such tape tearing problems of paint masking tapes, it has been proposed to reduce the adhesion between the paint masking tapes and paint films, but this approach is disadvantageous in that the paint films separate from the tape substrate and scatter in the form of flakes, contaminating the paint surface, during peeling operations. In addition, parting lines are often rendered indistinguishable when such paint flakes are formed.

SUMMARY OF THE INVENTION

An object of the present invention is to overcome the aforementioned drawbacks of prior art and to provide a paint masking tape that does not tear easily when peeled off, that inhibits the scattering of paint flakes formed by flaking, and that provides clearly visible parting lines.

The inventors have accomplished the present invention upon discovering that the stated object can be attained by adopting an approach in which the resin layer designed to inhibit flaking is formed from a urethane resin and an epoxy resin or a compound containing aziridine ring(s) on the back surface of the substrate of a paint masking tape for painting applications.

Specifically, the present invention provides a paint masking tape comprising a substrate, an adhesive layer formed on one side of the substrate, and a backing resin layer formed on the back surface of the substrate, wherein the backing resin layer contains a urethane resin and an epoxy resin or a compound containing aziridine ring(s).

This and other objects, features and advantages of the present invention are described in or will become apparent from the following detailed description of the invention.

This and other objects, features and advantages of the present invention are described in or will become apparent from the following detailed description of the invention.

DETAILED DESCRIPTION OF THE INVENTION

The present invention will now be described in detail.

Figure 1A:
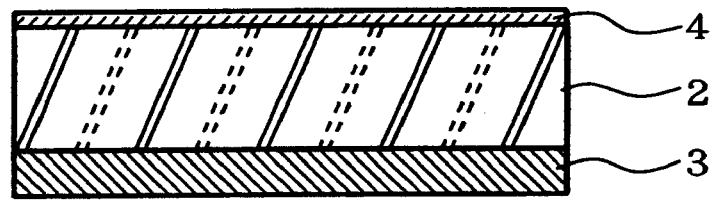
FIG. 1 is a cross section of the paint masking tape of the present invention.

The paint masking tape 1 of the present invention has an adhesive layer 3 on the surface of a substrate 2, and a backing resin layer 4 for inhibiting flake formation on the back surface of the substrate 2, as shown in FIG. 1A, where this paint masking tape is characterized in that the backing resin layer 4 comprises a least a urethane resin and an epoxy resin or a compound containing aziridine ring(s). Forming the backing resin layer 4 at least from a urethane resin and an epoxy resin or a compound containing aziridine ring(s) in such a manner impairs tape tearing when the paint masking tape 1 is peeled off, inhibits the scattering of paint flakes formed by flaking, and provides clearly visible parting lines. Although the reasons for this are not yet understood, a tentative explanation will be given below by way of comparison with conventional paint masking tapes.

Figure 3A:
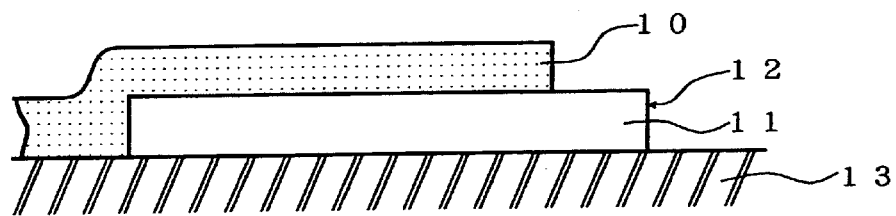
FIGS. 3A–3D are diagrams illustrating the peeling mechanism of a conventional paint masking tape.
Figure 3B:
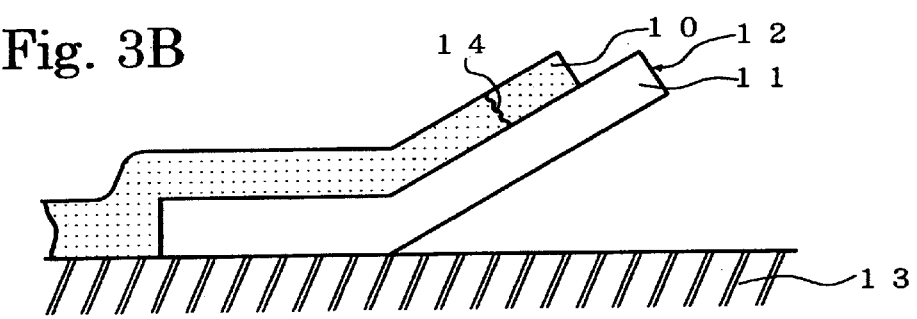
Figure 3C:
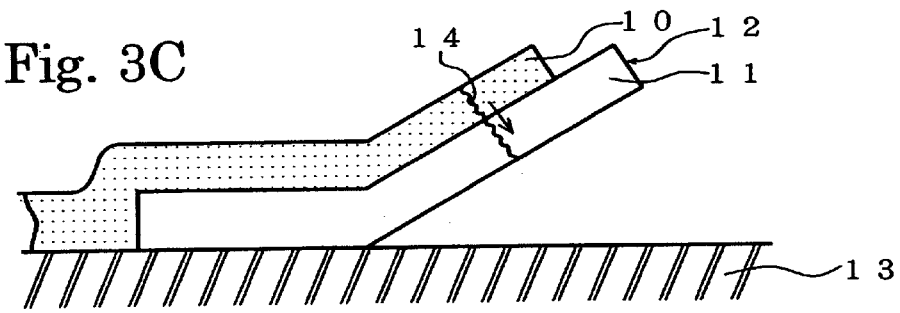
Figure 3D:
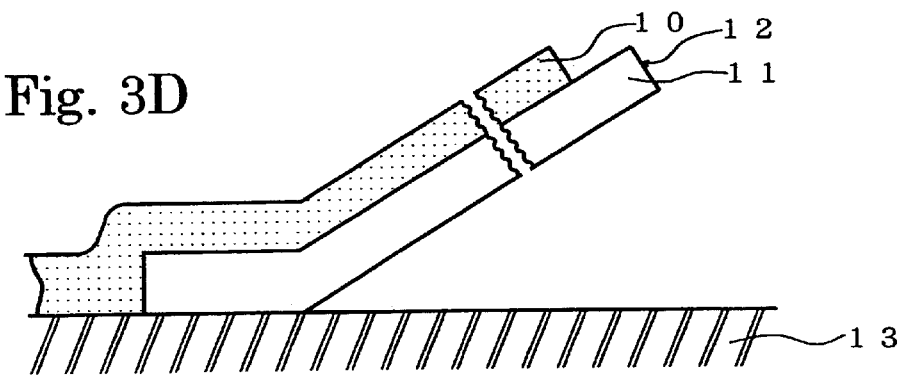

In the case of a conventional paint masking tape 11, the initial result of separating the distal end 12 of the paint masking tape 11 from a paint object 13 after the formation of a paint film 10 (FIG. 3A) is the formation of a crack 14 in the paint film 10 (FIG. 3B). It is believed in this case that, provided there is adequate bonding between the masking tape 11 and the paint film 10, the crack 14 propagates in the direction of the arrow in the masking tape 11 having a substrate (FIG. 3C), ultimately leading to tape tearing (FIG. 3D).

Figure 4A:
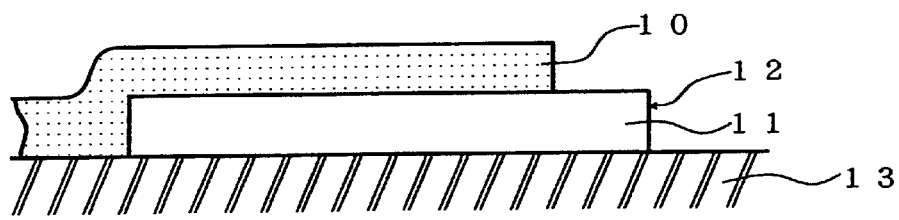
FIGS. 4A–4D are diagrams illustrating the peeling mechanism of a conventional paint masking tape.
Figure 4B:
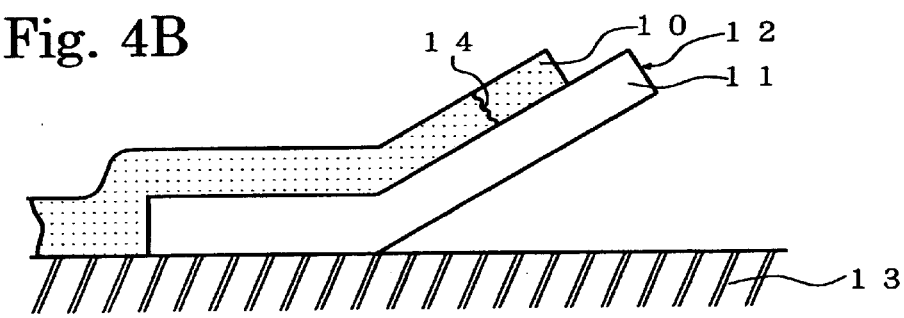
Figure 4C:
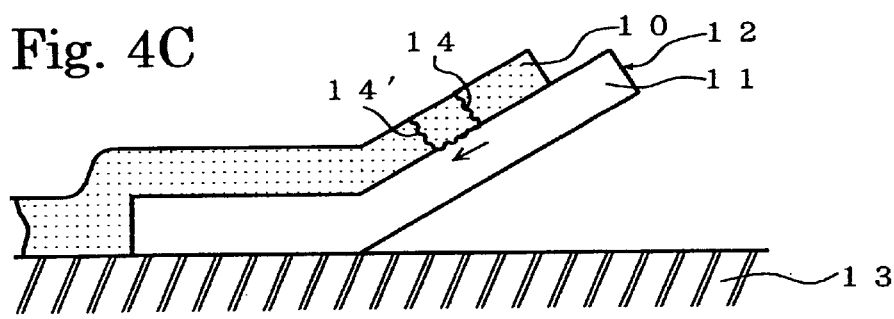
Figure 4D:
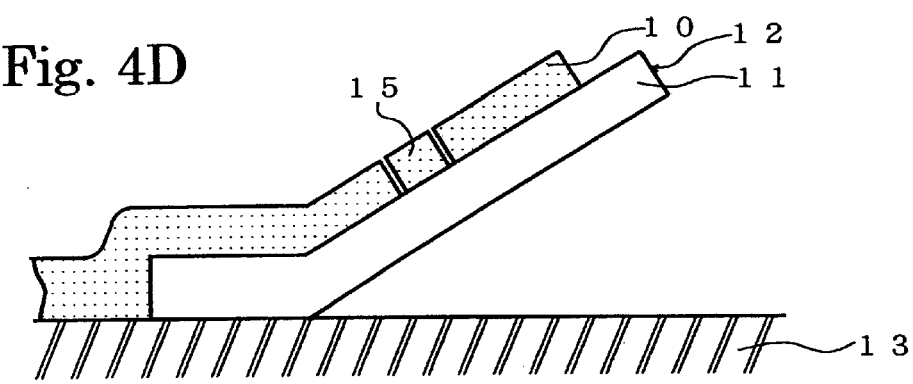

If bonding between the paint masking tape 11 and the paint film 10 is inadequate, the initial result of separating the distal end 12 of the paint masking tape 11 from the paint object 13 after the formation of a paint film 10 (FIG. 4A) will be the formation of a crack 14 in the paint film 10 (FIG. 4B), and continued peeling will cause the crack 14 to reach an adjacent crack 14' as a result of propagating in the direction of the arrow, that is, in the surface direction of the masking tape (FIG. 4C). This process results in the formation a paint flake 15 (FIG. 4D), which is then shed by the tape, released into the environment, and allowed to contaminate the paint surface.

Figure 2A:
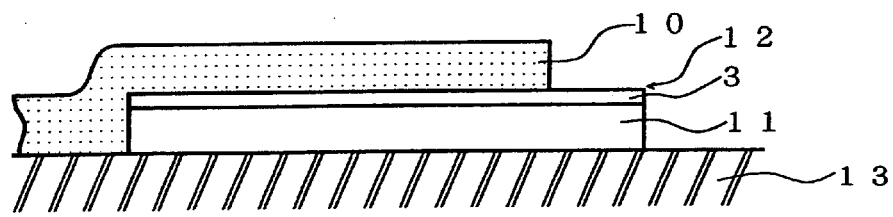
FIGS. 2A–2D are diagrams illustrating the peeling mechanism of the paint masking tape of the present invention.
Figure 2B:
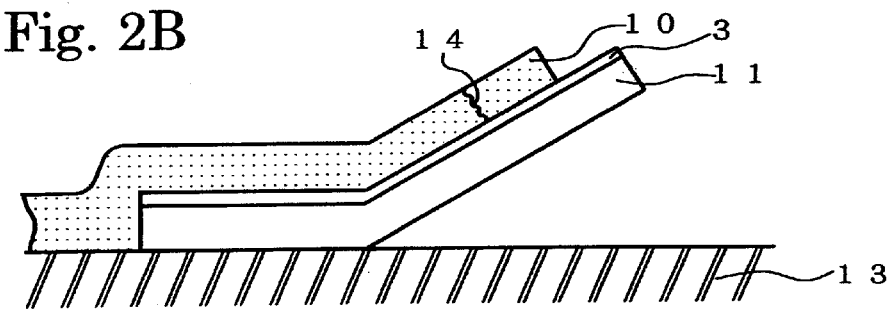
Figure 2C:
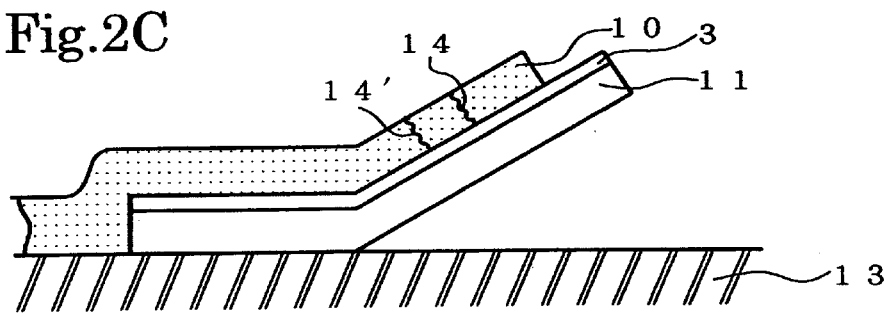
Figure 2D:
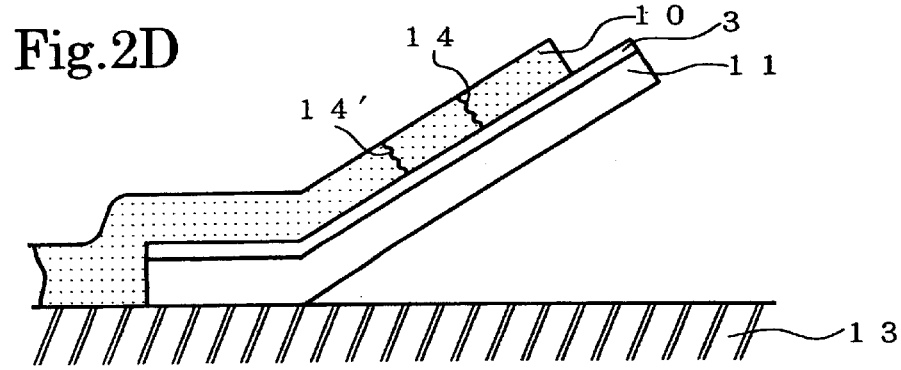

By contrast, the paint masking tape of the present invention is provided with a backing resin layer 4 composed of a urethane resin and an epoxy resin or a compound containing aziridine ring(s). As opposed to a paint masking tape devoid of such a backing resin layer 4, the tape substrate can be readily stretched by a very weak tensile force, and adhesion between the tape substrate and the paint film is kept sufficiently low. Consequently, the initial result of separating the distal end 12 of the paint masking tape 11 form the paint object 13 after the formation of a paint film 10 (FIG. 2A) is the formation of a crack 14 in the paint film 10 (FIG. 2B), but the crack 14 thus formed in the paint film 10 does not propagate toward the paint masking tape 11 because the adhesion between the paint film 10 and the paint masking tape 11 is kept sufficiently low (FIG. 2C). Continued peeling then stretches the masking tape 11 even when a crack 14' has appeared adjacent to the crack 14, and this stretching prevents the crack 14 from propagating all the way to the crack 14', making it possible to prevent the formation and scattering of paint flakes.

The present invention imposes no particular limitations on the substrate and allows any conventional plastic film to be used. Examples include films composed of polyesters, polyolefins, vinyl chloride, nylon, and the like.

The thickness of the substrate 2 is commonly 25–200 $\mu$m, but in the present invention a range of 50–150 $\mu$m is preferred because the visibility of the parting lines tends to decrease with an increase in the thickness of the substrate 2.

In the present invention, the backing resin layer 4 functions to adjust the adhesion between the paint masking tape 1 and the paint film formed thereon. The layer 4 also prevents the separation of paint flakes formed when the paint masking tape 1 is peeled off.

In the present invention, such a backing resin layer 4 comprises at least a urethane resin and an epoxy resin or a compound containing aziridine ring(s).

In this case, the urethane resin functions to endow the backing resin layer 4 with film-forming properties. For example, ether-type urethane resins or ester-type urethane resins may be used. Commercially available products may be used as such urethane resins. Specific examples include Nipporan 2301 (Polyurethane Kogyo) and Medium (Dainippon Ink & Chemicals).

In addition, using a urethane resin together with an epoxy resin or a compound containing aziridine ring(s) ensures that the adhesion between the paint masking tape 1 and the paint film is reduced to an appropriate level and that the entire masking tape is rendered readily stretchable.

A resin having two or more epoxy rings per molecule is preferred as such an epoxy resin from the standpoint of efficiency of reaction with the urethane resin. For example, a bisphenol-type epoxy resin is preferred for use. Specific examples include bisphenol A type epoxy resins, bisphenol F type epoxy resins, hydrogenation products of these resins, and epoxy resins modified with rubber on both sides of the bisphenol skeleton.

The mixing ratio of the urethane resin and the epoxy resin in the backing resin layer 4 should preferably correspond to 4.0–10.0 weight parts epoxy resin per 100 weight parts urethane resin. When the proportion of the epoxy resin falls below this range, the adhesion between the flake-inhibiting layer and the paint film tends to increase excessively, and when the proportion exceeds the aforementioned range, the masking tape tends to resist stretching.

In addition, a compound having two or more aziridine rings per molecule is preferred as a compound containing aziridine ring(s) from the standpoint of efficiency of reaction with the urethane resin. Preferred examples include trimethylol propane-tri-$\beta$-aziridinyl propionate and trimethylol methyl-$\beta$-aziridinyl propionate.

Although no particular restrictions are imposed on the mixing ratio of the urethane resin and the compound containing aziridine ring(s) in the backing resin layer, it is preferable for the proportion of the compound containing aziridine ring(s) to be 0.2–10.0 weight parts per 100 weight parts of the urethane resin. A proportion of 0.75–7.5 weight parts is even more preferable from the standpoint of the visibility of parting lines.

Acrylic resins, melamine resins, polyester resins, and other resins compatible with urethane resins and epoxy resins may also be added to the backing resin layer 4 as long as the object of the present invention is not compromised.

Because an excessively thin backing resin layer 4 makes it impossible to achieve the effects of the present invention, the thickness should preferably be 1 $\mu$m or greater, and particularly 3–10 $\mu$m.

In the present invention, the adhesive layer 3, which is designed for pasting the paint masking tape to a paint object, consists of base components and tackifying components.

Examples of materials that can be used as base components include styrene-isoprene-styrene copolymers, styrene-butadiene-styrene copolymers, styrene-ethylene-butylene-styrene copolymers, and other styrene-based copolymers, as well as acrylic acid ester copolymers and other known materials.

Aliphatic hydrocarbons, alicyclic hydrocarbons, hydrogenated starch, and other known adhesive resins may be used as tackifying components.

The thickness of such an adhesive layer is commonly 20–50 $\mu$m.

Figure 1B:
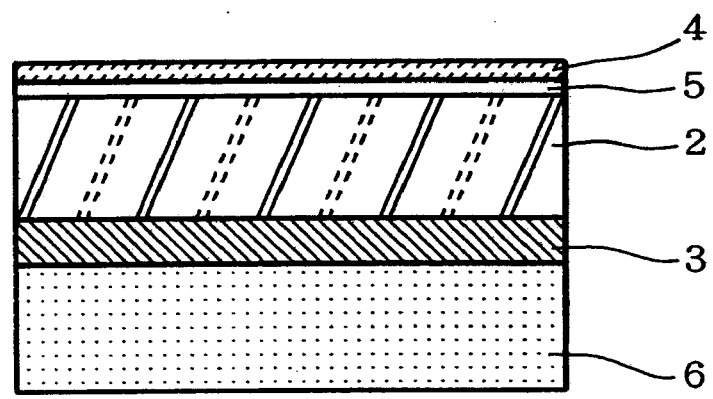

It is also preferable for a colored layer 5 obtained by dispersing a colorant in a binder to be formed between the substrate 2 and the backing resin layer 4 of the paint masking tape pertaining to the present invention, as shown in FIG. 1B. Providing a colored layer 5 makes painted areas more visible and facilitates masking and peeling.

Titanium oxide, clay, silica, mica, carbon, and the like may be used as the colorants for the colored layer 5, and urethane resins, polyester resins, acrylic resins, and the like may be used as binders. Here, the backing resin layer 4 contains a urethane resin, and using a urethane resin as a binder for the colored layer 5 is preferred from the standpoint of providing adequate adhesion between the backing resin layer 4 and the colored layer 5.

When the proposed paint masking tape described above has an elasticity at break that is too low, it is possible that failure will occur unless the adhesion between the backing resin layer 4 and the paint film is set fairly low, and when elasticity at break is too high, it is possible that the masking tape w ill be readily deformed during peeling, adversely affecting the visibility of parting lines. It is therefore preferable for the elasticity at break of the paint masking tape to be set to 20–60% when an epoxy resin is used for the backing resin layer 4, and to 30–350% when a compound containing aziridine ring(s) is used. As used herein, the term "elasticity at break" refers to the value achieved when baking is completed following the formation of a paint film on the backing resin layer 4.

In addition, the initial elastic modulus of the paint masking tape should be set to less than 10 kg/mm$^2$, and preferably 6–9 kg/mm$^2$, because a modulus that is too low results in excessive stretching and facilitates flaking, whereas a modulus that is too high makes failure more likely to occur.

A release sheet should also be laminated on the surface of the adhesive layer 3 of the paint masking tape in order to prevent the adhesive layer from accidentally adhering to other surfaces.

The paint masking tape of the present invention can be manufactured by a common method. For example, the desired paint masking tape can be manufactured by a method in which a gravure coater, knife coater, comma coater, or other coating apparatus is used to sequentially form first a flake-inhibiting layer or a colored layer and then a flake-preventing layer on a substrate. An adhesive layer is subsequently formed on the other side of the substrate, and a release sheet is optionally laminated on the adhesive layer.

The proposed paint masking tape described above can be used in the same manner as a conventional paint masking tape. An example will now be described in which the masking tape of the present invention is used during the surface coating of a vehicle.

The release sheet disposed on the adhesive layer side of the paint masking tape is first peeled off, and the surface of the adhesive layer is exposed and pasted to the desired location on the vehicle.

A melamine-based, melamine/alkyl-based, acrylic/melamine-based, or other thermosetting paint is then sprayed over the vehicle surface and the masking tape, and the coating is baked to cure the paint. Because in this case the surface of the masking tape has been provided with a flake-inhibiting layer, the paint covers the paint object and the flake-inhibiting layer.

Once baking has been completed, it is confirmed that the surface has returned to normal temperature, and the masking tape is peeled off, yielding the desired surface coat.

EXAMPLES

The present invention will now be described in further detail through examples.

Examples 1–4 and Comparative Examples 1 and 2
Fabrication of Paint Masking Tapes A urethane resin solution (Panacea CVL, manufactured by Dainippon Ink) containing titanium oxide was dried after being applied with the aid of a roll coater to a polypropylene film (P1146, manufactured by Toyobo) with a thickness of 80 μm, yielding a colored layer with a thickness of 3 μm.

The paints for backing resin layers shown in Table 1 were subsequently dried after being applied with the aid of a roll coater to the colored layer, yielding a backing resin layer with a thickness of 5 μm.

Comparative Example 2 pertains to a case in which no backing resin was used.

TABLE 1

|  | Examples | | | | (weight parts) Comparative Examples | |
|---|---|---|---|---|---|---|
| Component | 1 | 2 | 3 | 4 | 1 | 2 |
| Urethane resin solution*1 | 80 | 80 | 80 | 80 | 80 | — |
| Liquid epoxy resin*2 | 1.5 | 3.0 | — | — | — | — |
| Liquid epoxy resin*3 | — | — | 1.5 | 3.0 | — | — |
| MEK | 100 | 100 | 100 | 100 | 100 | 100 |

Notes to Table 1
*1: Medium M (40% solids), manufactured by Dainippon Ink
*2: EP4000, manufactured by Adeka
*3: CY184, manufactured by Ciba Geigy An adhesive layer based on styrene rubber was subsequently formed by drying an adhesive composition based on styrene rubber after applying it in a dry thickness of 30 μm to a surface obtained by the release treatment of a release sheet.

The release sheet provided with the aforementioned adhesive layer was then laminated in such a way that the surface of the adhesive layer of the sheet faced the side of a polyolefin film substrate opposite from the backing resin layer of the substrate, yielding a paint masking tape.

Fabrication of Coated Sample

The release sheet of the resulting paint masking tape was subsequently peeled off, and the paint masking tape was pasted over a prescribed area of an aluminum plate, yielding a portion in which the masking tape was pasted over the aluminum plate, and a portion in which no masking tape was pasted.

A melamine-based paint (manufactured by Nippon Paint) was subsequently sprayed as a paint for surface coating, yielding a 25 μm coat. The product was then baked at 80° C. for 10 minutes and at 150° C. for an hour, yielding coated samples pertaining to the practical and comparative examples.

Evaluation

The samples thus obtained were evaluated in accordance with the criteria described below. The results are shown in Table 2.

Peel Tests

The masking tape sections of the aforementioned coated samples were manually pulled about 20 cm at a peel angle of about 180°, and tape tearing was evaluated.

Here, "A" was assigned to cases in which no tape tearing occurred and the tape could be peeled off along a prescribed length; "B" was assigned to cases in which the tape, rather than tearing immediately after peeling, broke before a prescribed length had been peeled off; and "C" was assigned to cases in which the tape broke immediately after peeling and could not withstand usage.

Flaking (Scattering of Paint Film)

The flaking of the paint films on the samples subjected to the aforementioned peel tests was visually evaluated. Here, "A" was assigned to cases in which cracks in the paint films failed to produce paint flakes, or to cases in which the paint flakes were produced but were not shed by the masking tape, and "B" was assigned to cases in which the paint flakes were scattered to other areas.

Parting Lines

The visibility of parting lines between painted areas and unpainted areas was visually evaluated following the aforementioned peel tests. Here, "A" was assigned to cases in which the parting lines were clearly visible, "B" was assigned to cases in which the parting lines were not clearly visible but no problems were encountered in terms of actual usage; and "C" was assigned to cases in which the parting lines were not clearly visible and the tape was unsuitable for actual use.

Breaking Strength and Elasticity at Break

A coated sample was cut into widths of 20 mm, mounted on a Tensilon (a friction apparatus manufactured by Orientech), and measured for breaking strength and elasticity at break during peeling at a speed of 1000 mm/min.

Initial Elastic Modulus ($kg/mm^2$)

During the aforementioned measurements of breaking strength, an elastic modulus corresponding to an elongation of up to 10% was measured.

the flaking-induced scattering of paint flakes, and provide clearly visible parting lines.

Examples 5–11 and Comparative Examples 3 and 4

Fabrication of Paint Masking Tapes

A urethane resin solution (Panacea CVL, manufactured by Dainippon Ink) containing titanium oxide was dried after being applied with the aid of a roll coater to a polypropylene film (P1146, manufactured by Toyobo) with a thickness of 80 $\mu$m, yielding a colored layer with a thickness of 3 $\mu$m.

The paints for backing resin layers shown in Table 3 were subsequently dried after being applied with the aid of a roll coater to the colored layer, yielding a backing resin layer with a thickness of 5 $\mu$m.

Comparative Example 3 pertains to a case in which no backing resin was used.

TABLE 3

(weight parts)

| Components | Examples | | | | | | | Comparative Examples | |
|---|---|---|---|---|---|---|---|---|---|
| | 5 | 6 | 7 | 8 | 9 | 10 | 11 | 3 | 4 |
| Urethane resin solution*4 | 100 | 100 | 100 | 100 | 100 | 100 | 100 | — | — |
| Acrylic resin*5 | — | — | — | — | — | — | — | — | 100 |
| Compound containing aziridine ring(s)*6 | 0.75 | 1.25 | 2.50 | 5.00 | 7.50 | 10.00 | 0.2 | — | 0.3 |
| MEK | 100 | 100 | 100 | 100 | 100 | 100 | 100 | 100 | 100 |

Notes to Table 3
*4: Nipporan 2301 (40% solids), manufactured by Polyurethane Kogyo
*5: Methyl methacrylate/butyl acrylate copolymer
*6: TAZM, manufactured by Sogo Yakko

TABLE 2

| | Peel Test | Flaking | Parting Line | Elasticity at Break (%) | Breaking Strength (kgf) | Initial Elastic Modulus ($kg/mm^2$) |
|---|---|---|---|---|---|---|
| Example 1 | A | A | A | 30 | 2.80 | 8 |
| Example 2 | A | A | A | 55 | 2.80 | 7 |
| Example 3 | A | A | A | 24 | 2.50 | 8 |
| Example 4 | A | A | A | 27 | 2.70 | 7 |
| Comparative Example 1 | B | A | — | 15 | 2.00 | 10 |
| Comparative Example 2 | C | A | — | 10 | 1.50 | 35 |

It can clearly be seen in Table 2 that the paint masking tapes of Examples 1–4, which have a backing resin layer composed of a urethane resin and an epoxy resin, allow a prescribed length to be peeled off without being torn during tape separation. In addition, there is no flaking-induced scattering of paint flakes despite the formation of cracks, and the parting lines are clearly visible.

On the other hand, the paint masking tape of Comparative Example 1, which has a backing resin layer but does not contain an epoxy resin, has lower elasticity at break (elongation) and is more apt to tear than any of the paint masking tapes belonging to Examples 1–4. In addition, the paint masking tape of Comparative Example 2, which does not have a backing resin layer, develops a strong bond between the substrate and the paint film and tends to tear immediately after the start of the peel test.

Thus, the paint masking tapes of Practical Examples 1–4 do not tear easily when peeled off from a paint object, inhibit An adhesive layer based on styrene rubber was subsequently formed by drying an adhesive composition based on styrene rubber after applying it in a dry thickness of 30 $\mu$m to a surface obtained by the release treatment of a release sheet.

The release sheet provided with the aforementioned adhesive layer was then laminated in such a way that the surface of the adhesive layer of the sheet faced the side of a polyolefin film substrate opposite from the backing resin layer of the substrate, yielding a paint masking tape.

Fabrication of Coated Sample

The release sheet of the resulting paint masking tape was subsequently peeled off, and the paint masking tape was pasted over a prescribed area of an aluminum plate, yielding a portion in which the masking tape was pasted over the aluminum plate, and a portion in which no masking tape was pasted.

A melamine-based paint (manufactured by Nippon Paint) was subsequently sprayed as a paint for surface coating, yielding a 50 $\mu$m coat. The product was then baked at 150° C. for an hour, yielding coated samples pertaining to the practical and comparative examples.

Evaluation

The same procedures as in Practical Example 1 were used to evaluate the samples for peeling, flaking (paint film scattering), parting line visibility, and breaking strength and elasticity at break. The results are shown in Table 4. The tests for breaking strength and elasticity at break were performed at a release sample peel velocity of 300 mm/min.

TABLE 4

|  | Peel Test | Flaking | Parting Line | Elasticity at Break (%) | Breaking Strength (kgf) |
|---|---|---|---|---|---|
| Example 5 | A | A | A | 30 | 2.00 |
| Example 6 | A | A | A | 45 | 2.50 |
| Example 7 | A | A | A | 100 | 2.50 |
| Example 8 | A | A | A | 200 | 3.00 |
| Example 9 | A | A | A | 350 | 2.95 |
| Example 10 | A | B | B | 350 | 2.95 |
| Example 11 | B | A | A | 30 | 2.00 |
| Comparative Example 3 | B | A | — | 10 | 2.50 |
| Comparative Example 4 | C | A | — | — | 3.00 |

It can clearly be seen in Table 4 that the paint masking tapes of Examples 5–9, which have a backing resin layer composed of a urethane resin and a compound containing aziridine ring(s), allow a prescribed length to be peeled off without being torn during tape separation. In addition, there is no flaking-induced scattering of paint flakes, and the parting lines are clearly visible.

The results of Example 10 also demonstrate that when a comparatively large amount of a compound containing aziridine ring(s) is used, paint flakes tend to form despite the absence of tape tearing, and this trend is accompanied by a reduction in the visibility of parting lines. In addition, the results of Practical Example 11 demonstrate that the tape tends to tear more readily when the aziridine ring compound is used in a comparatively small amount.

On the other hand, the paint masking tape of Comparative Example 3, which does not have a backing resin layer, develops a strong bond between the substrate and the paint film and tends to tear immediately after the start of the peel test. In addition, the paint masking tape of Comparative Example 4, which has a backing resin layer containing an aziridine ring compound but does not contain a urethane resin, has lower elasticity at break (elongation) and is more apt to tear than any of the paint a masking tapes belonging to Examples 5–11.

In addition, it can be seen that, based on the elasticity at break achieved in Examples 5–11, the provision of a backing resin layer makes it possible to set the elasticity at break to at least 30–350%.

Thus, the paint masking tapes of Examples 5–11 do not tear easily when peeled off from a paint object, inhibit the flaking-induced scattering of paint flakes, and provide clearly visible parting lines.

The entire disclosures of the specifications, summaries, claims and drawings of Japanese Patent Applications Nos. 9-113070 filed on Apr. 30, 1997 and 9-115486 filed on May 6, 1997 are herein incorporated by reference in their entirety.

What is claimed is:

1. A paint masking tape, comprising:
a substrate defining a top side and a bottom side;
an adhesive layer having an adhesive formed on the bottom side of the substrate; and
a backing layer having a backing resin formed on the top side of the substrate, the backing resin including a urethane resin and an epoxy resin, wherein the backing layer includes the epoxy resin in an amount of 4.0–10.0 weight parts per 100 weight parts of the urethane resin.

2. The paint masking tape according to claim 1, wherein the epoxy resin is a bisphenol-type epoxy resin.

3. The paint masking tape according to claim 2, wherein the epoxy resin is one of a bisphenol A type epoxy resin, a bisphenol F type epoxy resin, a hydrogenation product of the urethane resin and the epoxy resin, and an epoxy resin modified with rubber.

4. A paint masking tape, comprising:
a substrate defining a top side and a bottom side;
an adhesive layer having an adhesive formed on the bottom side of the substrate; and
a backing layer including a backing resin formed on the top side of the substrate, the backing resin including a urethane resin and a material selected from the group consisting of an epoxy resin and a compound having at least one aziridine ring, wherein an elasticity at break during a peeling off of the masking tape is 20–60%.

5. A paint masking tape comprising:
a substrate comprising a top side and a bottom side;
an adhesive layer formed on the bottom side of the substrate;
a backing resin layer formed on the top side of the substrate, the backing resin layer comprising a urethane resin and a compound comprising at least one aziridine ring.

6. The paint masking tape according to claim 5, wherein the backing resin layer comprises a compound comprising at least one aziridine ring in an amount of 0.2–10.0 weight parts per 100 weight parts of the urethane resin.

7. The paint masking tape as defined in claim 6, wherein the compound comprising at least one aziridine ring is trimethylol propane-tri-β-aziridinyl propionate or trimethylol methyl-β-aziridinyl propionate.

8. The paint masking tape according to claim 5, wherein the elasticity at break during the peeling of the masking tape is 30–350%.

9. A paint masking tape, comprising:
a substrate defining a top side and a bottom side;
an adhesive layer having an adhesive formed on the bottom side of the substrate; and
a backing layer including a backing resin formed on the top side of the substrate, the backing resin including a urethane resin and a material selected from the group consisting of an epoxy resin and a compound having at least one aziridine ring, wherein a colored layer is formed between the substrate and the backing resin layer by dispersing a colorant in a binder.

10. A paint masking tape, comprising:
a substrate defining a top side and a bottom side;
an adhesive layer having an adhesive formed on the bottom side of the substrate; and
a backing layer including a backing resin formed on the too side of the substrate, the backing resin having a urethane resin and a material selected from the group consisting of an epoxy resin and a compound having at least one aziridine ring, wherein an initial elastic modulus is less than 10 kg/mm$^2$.

11. A paint masking tape, comprising:
a substrate defining a top side and a bottom side;
an adhesive layer having an adhesive formed on the bottom side of the substrate; and
a backing layer having a backing resin formed on the top side of the substrate, the backing resin having a urethane resin and a material selected from the group consisting of an epoxy resin and a compound having at least one aziridine ring, wherein an initial elastic modulus is 6–9 kg/mm$^2$.

* * * * *